(12) United States Patent
Gee et al.

(10) Patent No.: US 7,194,344 B2
(45) Date of Patent: Mar. 20, 2007

(54) SYSTEM AND METHOD TO CONTROL A SWITCHABLE POWERTRAIN MOUNT

(75) Inventors: Thomas Scott Gee, Canton, MI (US); Krish Mahadevan, Canton, MI (US); Darren Bisaro, Chandler, AZ (US)

(73) Assignee: Ford Motor Company, Dearborn, MI (US)

( * ) Notice: Subject to any disclaimer, the term of this patent is extended or adjusted under 35 U.S.C. 154(b) by 143 days.

(21) Appl. No.: 10/905,656

(22) Filed: Jan. 14, 2005

(65) Prior Publication Data
US 2005/0096804 A1 May 5, 2005

Related U.S. Application Data

(63) Continuation-in-part of application No. 10/064,170, filed on Jun. 18, 2002, now abandoned.

(51) Int. Cl.
*B60L 9/00* (2006.01)
*B62D 21/00* (2006.01)
*F16F 5/00* (2006.01)

(52) U.S. Cl. .................... 701/22; 180/312; 267/140.15
(58) Field of Classification Search ........... 267/140.15, 267/140.13, 140.14; 180/312; 701/22
See application file for complete search history.

(56) References Cited

U.S. PATENT DOCUMENTS

| 4,161,304 | A | | 7/1979 | Brenner et al. | |
| 4,277,056 | A | | 7/1981 | Ticks | |
| 4,664,219 | A | | 5/1987 | Hoerig et al. | |
| 5,145,156 | A | | 9/1992 | Muramatsu et al. | |
| 5,343,970 | A | | 9/1994 | Severinsky | |
| 5,360,080 | A | | 11/1994 | Yamazaki | |
| 5,393,041 | A | | 2/1995 | Takano et al. | |
| 5,642,873 | A | | 7/1997 | Kato | |
| 6,120,012 | A | | 9/2000 | Shibata et al. | |
| 6,332,603 | B1 | | 12/2001 | Rotsch et al. | |
| 6,386,527 | B2 | | 5/2002 | Oberle | |
| 6,422,546 | B1 | * | 7/2002 | Nemoto et al. | 267/140.14 |
| 6,487,477 | B1 | * | 11/2002 | Woestman et al. | 701/22 |
| 6,491,290 | B2 | | 12/2002 | Muramatsu et al. | |
| 6,631,895 | B2 | * | 10/2003 | Nemoto | 267/140.14 |
| 6,701,880 | B1 | * | 3/2004 | Gauthier et al. | 123/179.3 |

* cited by examiner

*Primary Examiner*—Mark Hellner
(74) *Attorney, Agent, or Firm*—David B. Kelley; Artz & Artz

(57) ABSTRACT

A strategy controls alternate anti-vibration modes in a switchable powertrain mount using vehicle operational status sensors and pre-selected thresholds. The switchable mount modes can include engine off-idle and an idle mode. Vehicle sensors and pre-selected thresholds can determine whether the engine is off-idle, or running in idle mode, whether the engine will likely remain in idle mode. From these determinations, the controller can command the switchable mount to engine idle mode when the controller determines the engine is in idle mode and will likely remain in idle mode. The switching means for the switchable mount can use a three-way vacuum solenoid valve (VSV), or a mechanical or electrical switch. In the case of the VSV configuration, the VSV is communicatively attached to the controller, a vacuum line connects the VSV to the switchable mount, and a second vacuum line connects the VSV to an engine intake manifold.

5 Claims, 3 Drawing Sheets

SYSTEM AND METHOD TO CONTROL A SWITCHABLE POWERTRAIN MOUNT

This Application is a continuation-in-part of U.S. patent application Ser. No. 10/064,170, filed Jun. 18, 2002 now abandoned, entitled "System and Method to Control a Switchable Powertrain Mount."

FIELD OF INVENTION

The present invention relates generally to a powertrain mount, and specifically to a control system and method for a switchable powertrain mount suited for a hybrid electric vehicle (HEV).

BACKGROUND OF INVENTION

The need to reduce fossil fuel consumption and emissions from automobiles and other vehicles predominately powered by internal combustion engines (ICEs) is well known. Vehicles powered by electric motors attempt to address these needs. Another alternative solution is to combine a smaller ICE with electric motors into one vehicle. Such vehicles combine the advantages of an ICE vehicle and an electric vehicle and are typically called hybrid electric vehicles (HEVs). See generally, U.S. Pat. No. 5,343,970 to Severinsky.

The HEV is described in a variety of configurations. Many HEV patents disclose systems where an operator is required to select between electric and internal combustion operation. In other configurations, the electric motor drives one set of wheels and the ICE drives a different set.

Other, more useful, configurations have developed. For example, a series hybrid electric vehicle (SHEV) configuration is a vehicle with an engine (most typically an ICE) connected to an electric motor called a generator. The generator, in turn, provides electricity to a battery and another motor, called a traction motor. In the SHEV, the traction motor is the sole source of wheel torque. There is no mechanical connection between the engine and the drive wheels. A parallel hybrid electrical vehicle (PHEV) configuration has an engine (most typically an ICE) and an electric motor that work together in varying degrees to provide the necessary wheel torque to drive the vehicle. Additionally, in the PHEV configuration, the motor can be used as a generator to charge the battery from the power produced by the ICE.

A parallel/series hybrid electric vehicle (PSHEV) has characteristics of both PHEV and SHEV configurations and is sometimes referred to as a "split" parallel/series configuration. In one of several types of PSHEV configurations, the ICE is mechanically coupled to two electric motors in a planetary gear-set transaxle. A first electric motor, the generator, is connected to a sun gear. The ICE is connected to a carrier. A second electric motor, a traction motor, is connected to a ring (output) gear via additional gearing in a transaxle. Engine torque can power the generator to charge the battery. The generator can also contribute to the necessary wheel (output shaft) torque with the engine "off", if the system has a one-way clutch. The traction motor is used to contribute wheel torque and to recover braking energy to charge the battery. In this configuration, the generator can selectively provide a reaction torque that may be used to control engine speed. In fact, the engine, generator motor and traction motor can provide a continuous variable speed transmission (CVT) effect. Further, the HEV presents an opportunity to better control engine idle speed over conventional vehicles by using the generator to control engine speed.

The desirability of combining an ICE with electric motors is clear. There is great potential for reducing vehicle fuel consumption and emissions with no appreciable loss of vehicle performance or drivability. The HEV allows the use of smaller engines, regenerative braking, electric boost, and even operating the vehicle with the engine shutdown. Nevertheless, new ways must be developed to optimize the HEV's potential benefits.

One such area of HEV development involves improvement of the vibration damping characteristics of the HEV powertrain mounting system. The ICE can be frequently started and stopped throughout a drive cycle. Vibration characteristics of an ICE during idle are different than during its normal operating speed. Automotive powertrain systems are generally suspended on a vehicle by support members usually called mounts. These mounts generally can be classified into two categories including rubber mounts and hydraulically damped rubber mounts. Each type has different anti-vibration characteristics.

A rubber mount, known in the art, utilizes a rubber element to achieve a desired anti-vibration characteristic. A hydraulically damped powertrain mount, known in the art, utilizes a rubber element, two fluid chambers, and a fluid de-coupler to achieve desired anti-vibration characteristics. The de-coupler can essentially be an orifice or other type of flow path that allows transfer of a fluid from one chamber to another. A larger orifice or shorter flow path allows easier fluid transfer and is useful for idle and start-up speeds. A smaller orifice or longer flow path restricts the fluid flow providing increased damping for normal engine running modes. See for example, U.S. Pat. No. 4,277,056 to Ticks.

Also known in the art are switchable powertrain mounts having a rubber element, two fluid chambers, two de-couplers, and a means to switch from one de-coupler to the other. The switching means can be vacuum controlled. This allows the same mount to achieve two sets of desired anti-vibration characteristics to minimize engine vibration felt by the vehicle occupants. One set of characteristics is designed to minimize vibration felt during engine idling, and the other set of characteristics is designed to minimize low-frequency vibration felt during driving. See for example, U.S. Pat. No. 5,642,873 to Kato. In these switchable mounts, the mount is simply controlled by the vacuum line. No controller or control logic is used to control the switchable mount.

In an HEV, a controller is useful to determine when to switch the mount to accommodate different vibration characteristics. For example, U.S. Pat. No. 4,161,304 to Brenner et al. uses a vibration sensor to determine the amount of spring rate of a mount. Nevertheless, a controller is unknown in the art to address the unique characteristics of an HEV powertrain. This controller would need to accommodate frequent engine start and stops in the typical HEV drive cycle.

SUMMARY OF INVENTION

Accordingly, the present invention provides a strategy to control a switchable powertrain mount and is suited for a hybrid electric vehicle (HEV). The strategy can have a mount assembly for coupling a vehicle powertrain assembly and a vehicle chassis, the mount assembly having at least one switchable mount operable in at least an engine idle mode, at least one vehicle sensor operatively connected to the powertrain, and a controller for receiving and processing input from the at least one vehicle sensor, and for commanding the switchable mount to be in the engine idle mode when the processed input of at least one vehicle sensor exceeds a pre-selected threshold.

In one embodiment, the strategy controls a switchable vehicle engine mount (switchable mount), comprising a powertrain having an engine; a vehicle; at least one switchable mount attached between the powertrain and the vehicle chassis, the switchable mount having at least two alternate anti-vibration modes, such as for engine off-idle mode and engine idle; means to switch the switchable mount anti-vibration modes; a set of vehicle sensors; a controller (as part of a vehicle system controller or a stand alone controller), using output from a set of vehicle sensors and pre-selected thresholds to determine whether the engine is in off-idle mode, or idle mode and whether the engine will likely remain in idle mode; and the controller further comprising a command to switch the switchable mount to engine idle mode when the controller determines the engine is in idle mode and will likely remain in idle mode.

The switching means for the switchable mount can use a three-way vacuum solenoid valve (VSV), or a mechanical or electrical switch. In the case of the VSV configuration, the VSV is communicatively attached to the controller, a vacuum line connects the VSV to the switchable mount, and a second vacuum line connects the VSV to an engine intake manifold.

The vehicle sensors comprise: engine speed, accelerator position, key ON/OFF, and gear selector (e.g., PRNDL) position, and traction battery state of charge. The sensor for engine speed measures a powertrain camshaft or crankshaft speed.

The pre-selected thresholds can measure increase in engine torque rate, increase in engine speed rate, and the rate of change of accelerator position.

Other advantages and features of the present invention will become more apparent to persons having ordinary skill in the art to which the present invention pertains from the following description taken in conjunction with the accompanying figures.

BRIEF DESCRIPTION OF FIGURES

The foregoing advantages and features, as well as other advantages and features will become apparent with reference to the description and figures below, in which like numerals represent like elements and in which.

DETAILED DESCRIPTION

Figure 1:
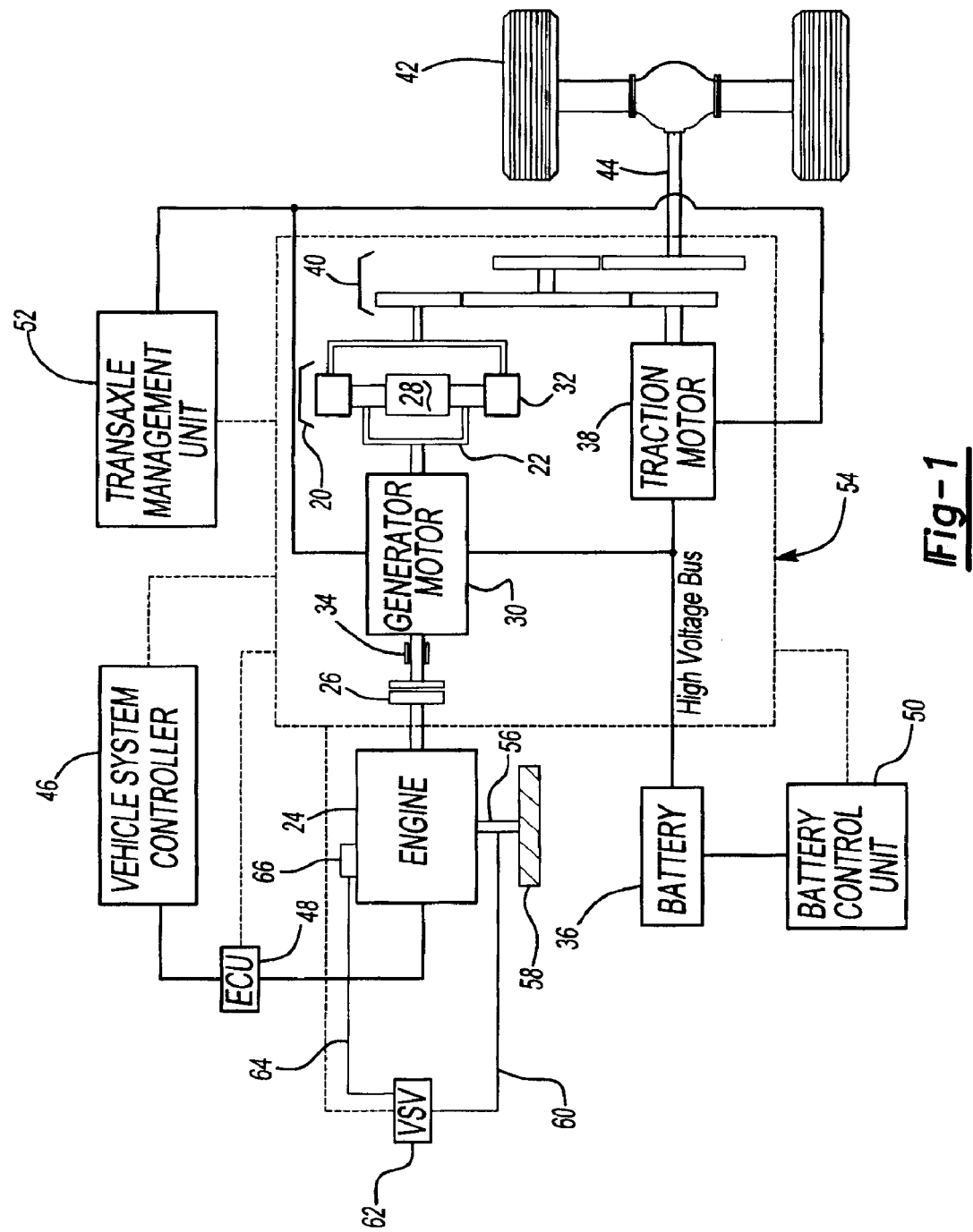
FIG. 1 illustrates a general hybrid electric vehicle (HEV) powertrain configuration.

The present invention relates to powertrain mounts and more particularly, to controllable powertrain mounts suited for hybrid electric vehicles (HEVs). FIG. 1 demonstrates just one possible powertrain assembly configuration, specifically a parallel/series hybrid electric vehicle (split) configuration.

In a basic HEV, a planetary gear set 20 mechanically couples a carrier gear 22 to an engine 24 via a one-way clutch 26. The planetary gear set 20 also mechanically couples a sun gear 28 to a generator motor 30 and a ring (output) gear 32. The generator motor 30 also mechanically links to a generator brake 34 and is electrically linked to a battery 36. A traction motor 38 is mechanically coupled to the ring gear 32 of the planetary gear set 20 via a second gear set 40 and is electrically linked to the battery 36. The ring gear 32 of the planetary gear set 20 and the traction motor 38 are mechanically coupled to drive wheels 42 via an output shaft 44.

The planetary gear set 20, splits the engine 24 output energy into a series path from the engine 24 to the generator motor 30 and a parallel path from the engine 24 to the drive wheels 42. Engine 24 speed can be controlled by varying the split to the series path while maintaining the mechanical connection through the parallel path. The traction motor 38 augments the engine 24 power to the drive wheels 42 on the parallel path through the second gear set 40. The traction motor 38 also provides the opportunity to use energy directly from the series path, essentially running off power created by the generator motor 30. This reduces losses associated with converting energy into and out of chemical energy in the battery 36 and allows all engine 24 energy, minus conversion losses, to reach the drive wheels 42.

A vehicle system controller (VSC) 46 controls many components in this HEV configuration by connecting to each component's controller. An engine control unit (ECU) 48 connects to the engine 24 via a hardwire interface. All vehicle controllers can be physically combined in any combination or can stand as separate units. They are described as separate units here because they each have distinct functionality. The VSC 46 communicates with the ECU 48, as well as a battery control unit (BCU) 50 and a transaxle management unit (TMU) 52 through a communication network such as a controller area network (CAN) 54. The BCU 50 connects to the battery 36 via a hardwire interface. The TMU 52 controls the generator motor 30 and traction motor 38 via a hardwire interface. These control units and the CAN 54 can include one or more microprocessors, computers, or central processing units in communication with one or more computer readable devices; one or more memory management units; and input/output interfaces for communicating with various sensors, actuators and control circuits.

The present invention provides a strategy to control a switchable powertrain mount within a mount assembly in vehicle usage, while minimizing the frequency of switching between the mount's two sets of anti-vibration characteristics. This strategy can be in a computer readable computer code format and embodied in the microprocessor computers described above.

The mount assembly of the present invention can couple a vehicle powertrain assembly and a vehicle chassis. For illustration purposes, FIG. 1 shows a switchable powertrain mount 56 attached to the engine 24 and a vehicle chassis 58. The switchable mount 56 could also be attached to any part of the powertrain that receives vibration from the engine 24 and multiple switchable mounts could be used. The switchable mount 56 can be vacuum controlled, electrically controlled or mechanically controlled. For purposes of illustration only, the present invention is described using a vacuum controlled switchable mount 56 that is well known in the art.

The switchable mount 56 can be configured to have, for example, two alternate modes of operation that correspond to two sets of anti-vibration characteristics: off-idle mode and idle mode. During idle mode, a vacuum line 60 attached to the mount 56 can apply a vacuum to the mount 56 to switch the mount 56 to proper anti-vibration characteristics for the engine idling condition. During off-idle mode, ambient air pressure could be applied to the switchable mount 56 (i.e., the vacuum is removed) to achieve proper anti-vibration characteristics for vehicle driving conditions. Thus, the default position of the switch in the switchable mount 56 is the off-idle mode.

A three-way vacuum solenoid valve (VSV) 62 can control the amount of vacuum within the vacuum line 60 and have two modes of operation: "on" (air is allowed to flow through the valve), and "off" (air is not allowed to flow through the valve, but air from the mount 56 is allowed to vent to the atmosphere). The "off-idle" mode can be the default drive mode. The VSC 46 via the CAN 54 in this illustration can control the actuation of the VSV 62. The vacuum source can be a second vacuum line 64 connecting the VSV 62 to an engine intake manifold 66.

The switchable mount 56, while useful for overall vehicle anti-vibration in conventional vehicles, poses design challenges in an HEV. Frequent starting and stopping of the engine 24 could lead to an unacceptable increased frequency of mount 56 and VSV 62 switching.

An HEV engine 24 can have several modes of operation, including: engine off, engine on-operating at most fuel efficient operating condition (drive mode), and engine on-idling. For the purposes of this specification, the engine off and engine drive modes are defined as "off-idle". Most known HEV applications include frequent switching between these modes of operation. The present invention provides a control strategy to minimize the frequency of changes in the switchable mount 56 and VSV 62 while maintaining the desired vehicle anti-vibration characteristics. To accomplish this, the controller can be configured to recognize when the engine 24 is changing or likely to change between these different modes of engine operation and switch the switchable mount 56 accordingly.

Figure 2:
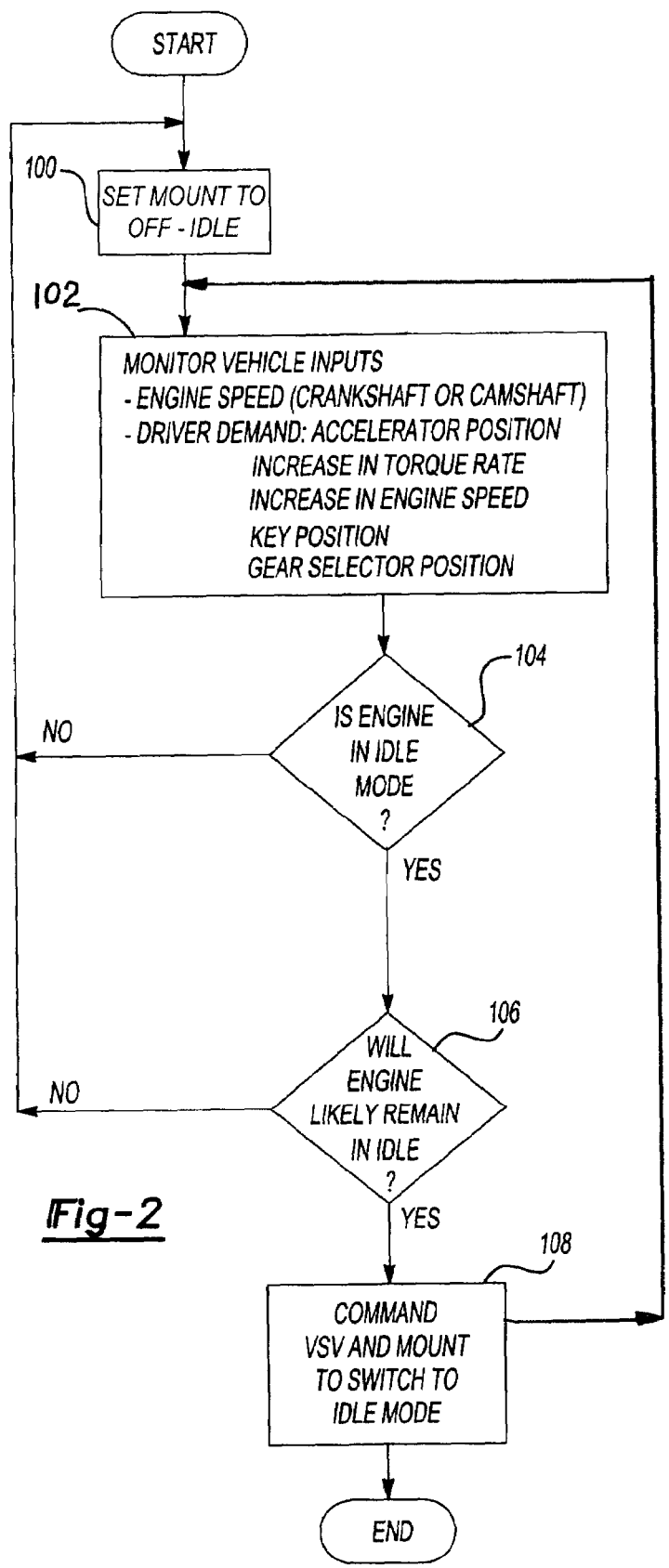
FIG. 2 illustrates a control strategy in accordance with an embodiment of the present invention.

One control strategy for minimizing the frequency of changes in the switchable mount 56 and VSV 62 while maintaining the desired anti-vibration characteristics is illustrated in FIG. 2. This strategy can be embodied within the VSC 46, or within a separate controller. The strategy can run continuously during each drive cycle.

This control strategy begins at step 100 and sets the mount 56 to its default "off-idle" (drive mode) position and proceeds to step 102. In step 102 the strategy begins to monitor vehicle inputs (from sensor outputs). Inputs can include, without limitation: engine 24 speed or rpm (via a crankshaft or camshaft sensor) and operator demand, or state of charge of the vehicle's traction battery. Operator demand can be determined, for example, by monitoring: accelerator position, increase in torque rate, increase in engine 24 rpm, key ON/OFF position, and gear selector position. This list is not all-inclusive, nor do all embodiments require all of these inputs. Other means for determining operator or driver demand are known in the art. Each input includes the use of available measuring devices for detecting the status or value of a measured parameter. Also contemplated is the use of known hardware and software for converting the measured parameter into electronic form, such as in a digital format, for evaluation by a microprocessor embodied in the controller.

Once the controller embodying the strategy has monitored vehicle inputs for a particular configuration, it determines whether the engine 24 is in idle mode at step 104. Idle mode determination can use, for example, engine 24 rpm or speed. Other means for determining idle mode are known in the art. If a "no" determination is arrived at step 104 the strategy preferably causes cycling back to the beginning.

Figure 3:
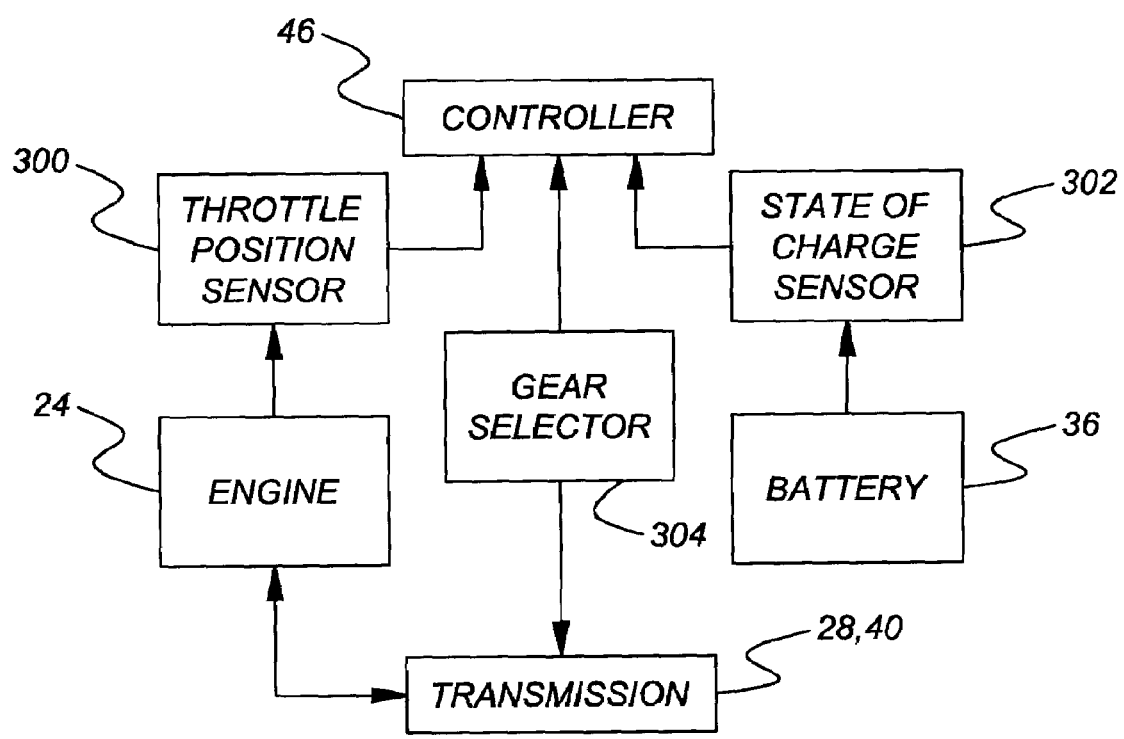
FIG. 3 illustrates a portion of a hybrid electric vehicle (HEV) powertrain according to one aspect of the present invention.

If "yes" is determined at step 104, the strategy proceeds to step 106 and controller 46 determines whether the engine 24 will likely remain in idle speed. This determination can be made using a variety of pre-selected thresholds and predictors. For example, if engine 24 speed is increasing rapidly, or if the rate of change of accelerator position is above a predetermined threshold, it can be assumed the engine 24 will likely not remain in idle mode. Considering the output of sensor 302, if traction battery 36 is charged insufficiently, engine 24 will be needed to achieve the desired acceleration. Also, if the engine 24 is started from zero rpm and commanded to operate at high speed, the engine 24 will only briefly pass through the engine 24 idling speed. Consequently, switching the mount 56 to "on" (idle mode) would have a little anti-vibration benefit to the driver and mount 56 would thus not be switched. FIG. 3 shows various discrete sensors, such as throttle position sensor 300, state of charge sensor 302, and gear selector 304, which incorporates gear position sensing.

Pre-selected thresholds such as a particular rate of engine 24 rpm increase or a delay timer can be used to prevent switching the mount 56 and VSV 62 to idle. For illustrative purposes only: a delay timer could be set to expire between 500 to 1000 milliseconds; and a rate of engine speed change might be set to require exceeding of a threshold rate greater than 4000 rpm/sec to trigger a "no" determination.

If at step 106 the determination as to whether the engine 24 will remain in idle is "no", the strategy proceeds to the beginning. If yes at step 106, the strategy commands the mount 56 and VSV 62 to "ON" (idle mode) at step 108.

FIG. 3 illustrates a specific embodiment according to the present invention, in which controller 46 receives inputs from throttle position sensor 300, as well as from gear selector 304, and battery state of charge sensor 302.

According to another aspect of the present invention powertrain mount 56 will be commanded to remain in the off-idle mode upon startup of engine 24 in the event that controller 46 determines that engine 24 will quickly be transitioning into an off-idle mode. This determination may be made according to the logic employed in block 106 of FIG. 2. For example, if the battery state of charge is low, or if the transmission is placed in the "drive" range, it is likely that engine 24 will be moving quickly to a higher speed. In this case, "quickly" means on the order of tenths of a second. Conversely, powertrain mount 56 will be commanded to switch to an idle mode upon startup of the engine in the event that controller 46 determines that engine 24 will remain in an idle mode for at least a predetermined period of time, measured in seconds. For example, if gear selector 304 is in the neutral position, and if state of charge sensor 302 indicates that batter 36 is fully charged, it is likely that engine 24 will not be operated in an off-idle condition, and as a result, it is appropriate for mount 56 to be placed in the "idle" mode.

The above-described embodiment of the invention is provided purely for purposes of example. Many other variations, modifications, and applications of the invention may be made.

What is claimed is:

1. A mount assembly for coupling a hybrid electric vehicle powertrain assembly and a vehicle chassis, the mount assembly comprising:
   at least one switchable mount operable in at least an engine off-idle mode;
   a plurality of vehicle sensors operatively connected to the powertrain assembly, with said sensors comprising at least an accelerator position sensor, a gear selector position sensor, and a battery state of charge sensor; and a controller for receiving and processing inputs from said plurality of sensors, with said controller commanding said mount assembly to remain in the engine off-idle mode in the event that the sensed rate of change of accelerator position, the sensed gear selector position, and the sensed battery state of charge indicate an operator demand which can be satisfied without use of the vehicle's engine.

2. A system for controlling a powertrain mount incorporated in a hybrid electric vehicle, the system having a digital processor with a memory containing an algorithm that responds to a plurality of vehicle operating parameters to achieve a powertrain mount control that comprises the steps of:

sensing accelerator position and determining the rate of change of accelerator position; determining gear selector position;

determining the state of charge of the vehicle's traction battery;

using the previously determined rate of change of accelerator position, as well as the gear selector position and battery state of charge to determine whether the vehicle's engine should be started to satisfy driver demand; and commanding a powertrain mount to remain in an off-idle position in the event that driver demand may be satisfied without starting the engine.

3. A method for controlling a powertrain mount incorporated in a hybrid electric vehicle having an internal combustion engine, using a system having a digital processor with a memory containing an algorithm that responds to a plurality of vehicle operating parameters to achieve a powertrain mount control, with said method comprising the steps of:

sensing accelerator position and determining the rate of change of accelerator position; determining gear selector position;

determining the state of charge of the vehicle's traction battery;

using the previously determined rate of change of accelerator position, as well as the gear selector position and battery state of charge to determine whether the vehicle's engine should be started to satisfy driver demand; and commanding a powertrain mount to remain in an off-idle mode in the event that driver demand may be satisfied without starting the engine.

4. A method according to claim 3, wherein said powertrain mount is commanded to remain in an off-idle mode upon startup of the engine, in the event that a controller determines that the engine will quickly be transitioning into an off-idle mode.

5. A method according to claim 3, wherein said powertrain mount is commanded to switch to an idle mode upon startup of the engine, in the event that a controller determines that the engine will remain in an idle mode for at least a predetermined period of time.

* * * * *